United States Patent [19]

Effront

[11] Patent Number: 4,728,926

[45] Date of Patent: Mar. 1, 1988

[54] APPARATUS ENABLING THE IDENTIFICATION OF A PERIODIC COMPOSITE SIGNAL MADE UP OF A TRAIN OF ELEMENTARY SIGNALS

[76] Inventor: Yves Effront, rue des Granges 6, 1204 - Geneva - Canton of Geneva, Switzerland

[21] Appl. No.: 715,521

[22] Filed: Mar. 25, 1985

[30] Foreign Application Priority Data

Mar. 30, 1984 [CH] Switzerland .................... 1630/84

[51] Int. Cl.[4] .................... H03M 13/10; G01C 21/00
[52] U.S. Cl. ................................. 340/146.2; 364/443
[58] Field of Search ............... 364/443, 456, 461, 572, 364/452; 340/825.3, 825.31, 146.2; 455/604; 342/41, 46

[56] References Cited

U.S. PATENT DOCUMENTS

| | | | |
|---|---|---|---|
| 3,806,922 | 4/1974 | Isbister | 342/41 X |
| 3,855,576 | 12/1974 | Braun et al. | 340/146.2 |
| 3,870,992 | 3/1975 | Hanna, Jr. | 342/41 X |
| 4,104,629 | 8/1978 | Isbister et al. | 342/46 X |
| 4,318,105 | 3/1982 | Brodeur | 364/452 X |
| 4,339,751 | 7/1982 | Pease | 342/41 |
| 4,354,252 | 10/1982 | Lamb et al. | 340/825.3 X |
| 4,611,209 | 9/1986 | Lemelson et al. | 342/41 X |
| 4,630,208 | 12/1986 | Le Pechon | 364/443 |

Primary Examiner—Gary V. Harkcom
Assistant Examiner—Tan V. Mai
Attorney, Agent, or Firm—Silverman, Cass, Singer & Winburn, Ltd.

[57] ABSTRACT

Apparatus enables the identification of a periodic composite signal made up of a train of elementary signals and produced, for example by a marine light. At each elementary signal of the composite signal, the operator operates a switch feeding into the apparatus pulses which are treated by a microprocessor; the trains of these pulses are stored in a live memory, compared to each other in such a way that there is retained only that train which is the most representative, this most representative train being compared with information contained in dead memories constituting a reference table. That one of the sets of information contained in the memories which appears as being identical to the train of pulses recognized as being representative is then displayed as an indication directly usable to enable the operator to know the identity of the emitter and, may be, the main characteristics of this emitter such as its name, its position, or other characteristics.

7 Claims, 1 Drawing Figure

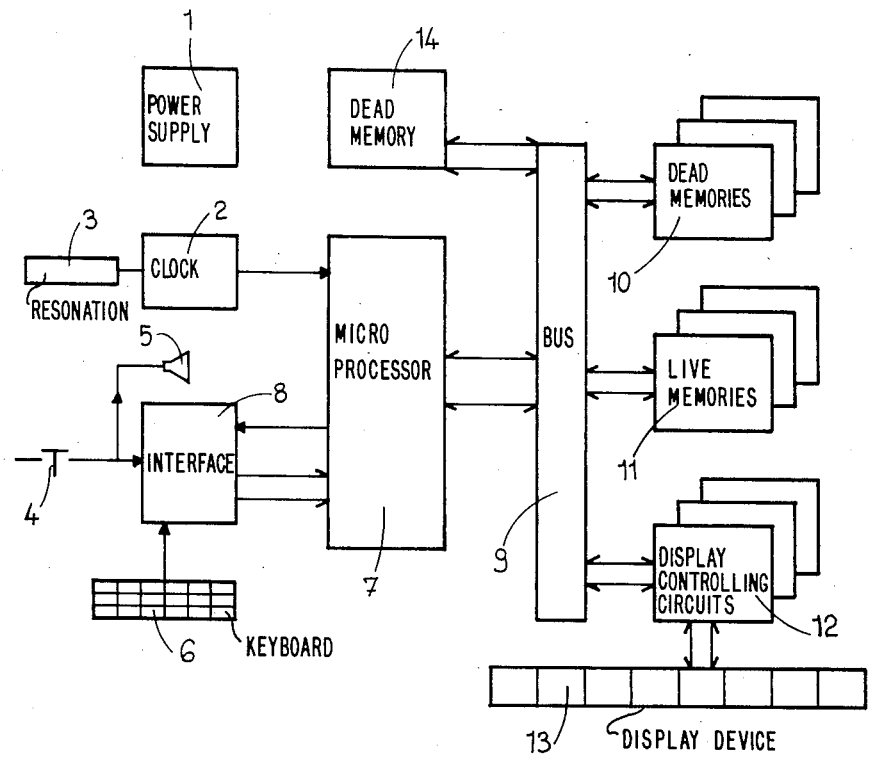

APPARATUS ENABLING THE IDENTIFICATION OF A PERIODIC COMPOSITE SIGNAL MADE UP OF A TRAIN OF ELEMENTARY SIGNALS

BACKGROUND OF THE INVENTION

The present invention relates to an apparatus enabling the identification of a periodic composite signal made of a train of elementary signals the number and the rhythm of which constitute the characteristic of the emitter of the composite signal.

The present apparatus is suitable for use by navigators, and more especially by yachtsmen who have to take the bearings of emitters of periodic signals, more especially of marine lights and, to this effect, must identify the emitter, often in difficult conditions.

SUMMARY OF THE INVENTION

The object of the invention is to furnish for use by navigators means enabling the identification of emitters of signals which is reliable, easily operated, not cumbersome and the cost of which is low.

This object is achieved by the fact that the apparatus according to the invention comprises means enabling pulses to be introduced into the apparatus at a rhythm corresponding substantially to that of the elementary signals, a time base arranged in such a way as to measure the time intervals separating the input of the said pulses, error treatment means arranged in such a way as to recognize the periodicity of said pulses by sampling trains thereof, a coding means for coding that one of said periodic trains of pulses which said error treatment means recognizes as representative, means of comparison between the train of pulses recognized as representative and information contained in a reference stock, in order to search for an equivalence, and display means of the equivalence recognized which provides this equivalence in a form enabling identification of the emitter.

The various features of the invention will be apparent from the following description, drawings and claims, the scope of the invention not being limited to the drawings themselves as the drawings are only for the purpose of illustrating ways in which the principles of the invention can be applied. Other embodiments of the invention utilising the same or equivalent principles may be used and structural changes may be made as desired by those skilled in the art without departing from the present invention and the purview of the appended claims.

BRIEF DESCRIPTION OF THE DRAWINGS

The sole FIGURE is a block diagram of the circuit of an apparatus for the identification of signals.

DESCRIPTION OF THE PREFERRED EMBODIMENTS

The apparatus illustrated comprises a power supply 1, consisting of an accumulator or a primary battery, a clock 2 driven by a quartz resonator 3, a switch 4 operable manually, by means of a push-button or of a key, enabling the operator to repeat the signals of the emitter he is looking at and hence to introduce into the apparatus pulses at a rhythm corresponding to the rhythm of the elementary signals from which is formed the periodic composite signal produced by the emitter, and an optical or acoustic check indicator 5 enabling the introduction of the said pulses to be checked, constituted for instance by a vibrator or by a loud-speaker.

The apparatus also comprises a control keyboard 6, which is not absolutely necessary but which is useful to enable special instructions to be introduced into the apparatus, a microprocessor 7 operatively driving the apparatus and an electronic interface 8 interposed between the control switch 4 and the control keyboard 6 on the one hand and the microprocessor 7 on the other hand. The interface 8 comprises, amongst others, an electronic counting circuit transforming the time intervals separating the input of pulses into the apparatus, measured by the clock 2, into numeric values and rounding them. The apparatus comprises moreover a bus 9 permitting the transfer of data and of addresses as well as the control orders of the microprocessor, one or several modules of dead memory (MEM) 10, movable and interchangeable, intended to store information constituting a reference table, one or several modules of live memories (MEV) 11 able to contain the exact values, numerized and rounded, of the time intervals separating the inputs of pulses produced by the operator, a circuit 12 controlling the display of a liquid crystal display device 13; and finally one or several modules of dead memory (MEM) 14 intended to store logic and which ensure the recognition of periodicity, the selection of the coded elements of the period which have to be searched in the reference table, the search in this table, the switching on of the clear display of the identity of the emitter and of its characteristics, after identification, and then the display of instructions of what has to be done in the case of non identification.

The present apparatus is used as follows: for the identification of a marine light, for example, at each flash of this light the operator depresses the push-button of the switch 4, thus producing a set of pulses. These pulses reproduce, with more or less accuracy, the train of elementary signals which constitutes the composite signal periodically emitted by the marine light. At each operation of the switch 4, an optical or acoustic signal produced by the indicator 5 the operator to be sure that the manipulation of the switch 4 has been correctly effected.

The microprocessor 7 transforms the time intervals separating the pulses into numerical values which, moreover, it rounds.

This microprocessor 7 is also arranged in such a way as to effect the recognition of the periodicity of the pulses. To this effect, and since irregularities in the speed of reaction of the operator have as a consequence differences in the time intervals, the microprocessor effects a sampling of the pulse trains stored in the modules of live memory 11 to which they have been routed. The train of pulses which is finally recognized as representative is then compared with the information contained in the modules of dead memory 14 and the result of this comparison is displayed by the display device 12 which immediately provides a clear display of the identity of the marine light as well as the characteristics of this marine light which it is useful to know, such as its position, its name, etc. The display device also gives to the operator instructions concerning the steps to be taken in case of non identification.

In a preferred embodiment, the apparatus will have modules of memory 11 arranged in such a way as to be able to contain a number of items of information corresponding to ten cycles, for example, of the marine light comprising the most number of flashes in its period.

It is important that the division of the memorization in geographic zones be such that there are not two emitters of equivalent characteristics in the same zone or sector.

The modules of dead memory 10 being interchangeable, they will be chosen depending on the geographic zone in which the observator is situated.

As a modification, one can provide an arrangement where the input of the pulses will not be effected manually by the operator, but automatically, the apparatus then comprising a receptor reacting to the signals produced by the emitter.

I claim:

1. An apparatus enabling the identification of a periodic composite signal made up of a train of elementary signals, the number and rhythm of which constitute a characteristic of an emitter of said composite signal, comprising:

means enabling pulses to be humanly introduced into said apparatus at a rhythm, periodicity and in a train corresponding substantially to that of said elementary signals;

a time base arranged in such a way as to measure the time intervals separating the input of said pulses;

error treatment means arranged in such a way as to recognize the periodicity of said pulses by sampling trains thereof;

coding means for coding one of said sampled periodic trains of pulses which said error treatment means recognizes as representative;

means of comparison between the train of pulses recognized as representative and information contained in a reference stock, in order to search for an equivalence; and display means of the recognized equivalence which provide said equivalence in a form enabling the identification of said emitter.

2. Apparatus as claimed in claim 1, comprising a check indicator responsive to said introduction, into the apparatus, of the pulses corresponding to the elementary signals of the periodic composite signal to be identified.

3. Apparatus as claimed in claim 1, in which said error treatment means comprises an electronic counting circuit transforming the time intervals measured by said time base into numeric values and means rounding these numeric values, and a memory zone able to contain the exact numerized and rounded values of said time intervals.

4. Apparatus as claimed in claim 1, in which the said reference stock comprises at least one module of dead memory able to store the logic required to ensure said recognition of periodicity, the selection of the coded elements of the period which has to be searched in said reference stock, the search through said stock and commencement of the clear display of the identity of the emitter to enable the immediate identification thereof.

5. Apparatus as claimed in claim 4, in which said display means are controlled in such a way as to furnish a clear display of the identity of the emitter and its characteristics.

6. Apparatus as claimed in claim 4, in which said display means are controlled in such a way as to furnish instructions in case of non identification between the train of pulses recognized as valid and the information contained in the reference stock.

7. Apparatus as claimed in claim 1, in which said means enabling pulses to be introduced into the apparatus are arranged in such a way as to be manually operable.

* * * * *